United States Patent [19]
Geiger

[11] Patent Number: 5,861,685
[45] Date of Patent: Jan. 19, 1999

[54] PUMP AND MASTER VALVE CIRCUIT ISOLATOR APPARATUS

[76] Inventor: James E. Geiger, 1848 Germaine Dr., Yuba City, Calif. 95993

[21] Appl. No.: 900,239

[22] Filed: Jul. 24, 1997

Related U.S. Application Data

[60] Provisional application No. 60/022,602 Jul. 24, 1996.

[51] Int. Cl.$^6$ ................................................ G05B 11/01
[52] U.S. Cl. ........................... 307/130; 239/70; 361/191; 137/820
[58] Field of Search ................................... 307/130, 125, 307/191, 166, 167; 239/70; 137/820

[56] References Cited

U.S. PATENT DOCUMENTS

| | | | |
|---|---|---|---|
| 4,078,196 | 3/1978 | Thadani | 361/191 |
| 4,719,532 | 1/1988 | Schneider | 361/191 |
| 4,852,613 | 8/1989 | Tippetts et al. | 137/820 |
| 5,287,888 | 2/1994 | Geiger | 239/70 |
| 5,414,618 | 5/1995 | Mock et al. | 239/70 |

*Primary Examiner*—Albert W. Paladini
*Attorney, Agent, or Firm*—John P. O'Banion

[57] ABSTRACT

A circuit isolator apparatus for use with pump or master valve circuits having a plurality of controllers connected thereto. One isolator apparatus is used in association with each controller. The isolator apparatus includes a pair of relays which allow only one controller to access the pump or valve circuit at a time to prevent feedback between controllers and damage to controllers due to incorrect phasing.

3 Claims, 2 Drawing Sheets

5,861,685

PUMP AND MASTER VALVE CIRCUIT ISOLATOR APPARATUS

CROSS-REFERENCE TO RELATED APPLICATIONS

This application claims priority from U.S. provisional application Ser. No. 60/022,602 filed on Jul. 24, 1996.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to pump and valve controllers for irrigation and landscaping water systems, and more particularly to a circuit isolator apparatus for pump and master valve circuits which eliminates feedback and phasing problems which can occur when multiple controllers are included in a single circuit.

2. Description of the Background Art

Timed controllers are commonly used to provide power for operation of pumps or master valves in irrigation or landscaping water systems. Frequently, multiple controllers are tied to the same circuit for operation of a common pump or master valve. When the area to be irrigated is large, the individual controllers can be hundreds of yards apart.

Various problems arise when two or more controllers which are interconnected through the same circuit are operating at the same time. The problem of feedback or crosstalk between controllers on the same circuit can result in strange or unwanted behavior of the controllers such as unscheduled cycle starts and stops. Another problem experienced is incorrect phasing or reversed polarity of controllers, which can result in serious damage to multiple controllers on the circuit. A further problem is that, when a controller circuit breaker has been tripped due to a faulty solenoid, the circuit breakers on other controllers on the circuit may also be tripped by the same faulty solenoid upon activating the pump or valve circuit.

The feedback problem can be overcome through use of a separate pump relay for each controller. Manufacturers of irrigation controllers typically recommend that each controller on a circuit be wired to a separate relay at the pump or valve location where the contacts can switch to a separate power source individually or together, without interconnecting the controllers. In practice, however, the recommended relays are not used, since it is an expense which is easily eliminated during new construction. Even when a separate relay is used for each controller, the aforementioned problem of incorrect phasing of multiple controllers on a circuit may not be avoided. The use of good design practices and adherence to electrical codes can resolve phasing problems but, in order to reduce costs, this practice is not carried out.

Accordingly, there is a need for a circuit isolator apparatus for use in circuits wherein multiple controllers are interconnected through a pump or valve circuit which eliminates feedback and phasing problems, and which avoids unwanted tripping of multiple circuit breakers. The present invention satisfies those needs, as well as others, and generally overcomes the deficiencies found in the background art.

BRIEF SUMMARY OF THE INVENTION

The present invention pertains to a circuit isolator apparatus for use with water or irrigation pump or master valve circuits having a plurality of controllers. The invention eliminates feedback between controllers sharing the circuit and protects controllers from damage that occurs when one or more controllers are out of phase or reversed in polarity.

By way of example, and not of limitation, an isolator apparatus in accordance with the present invention includes a pair of switches, such as relays, for use with each controller on a pump circuit. The relays are interconnected such that the associated controller must activate one of the relays in order to power the pump circuit. The other relay will deny access by the controller to the circuit if the pump is already in use by another controller. By way of example, and not of limitation, the isolator apparatus includes a first relay which is configured to prevent feedback between controllers, and a second relay which prevents interconnection of controllers to avoid phasing problems.

An object of the invention is to provide a pump and master valve circuit isolator apparatus which eliminates feedback between controllers on a circuit.

Another object of the invention is to provide a pump and master valve circuit isolator apparatus which eliminates the risk of damage due to incorrectly phased controllers on the circuit.

Another object of the invention is to provide a pump and master valve circuit isolator apparatus which avoids tripping of circuit breakers on multiple controllers due to a faulty solenoid.

Another object of the invention is to provide a pump and master valve circuit isolator apparatus which is simple and easy to use.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
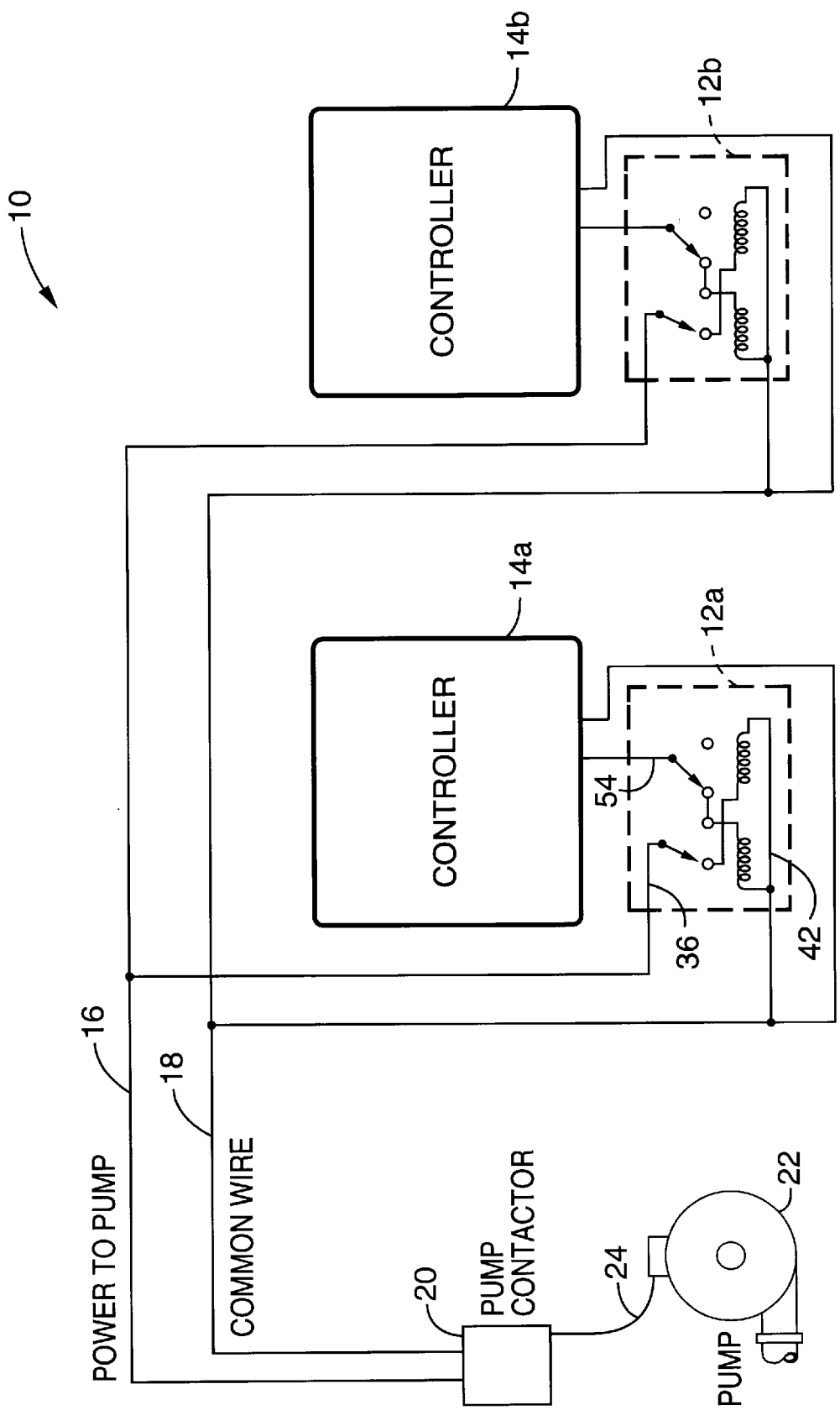
FIG. 1 is a schematic diagram of a pump circuit with a plurality of controllers using the isolator apparatus of the invention.
Figure 2:
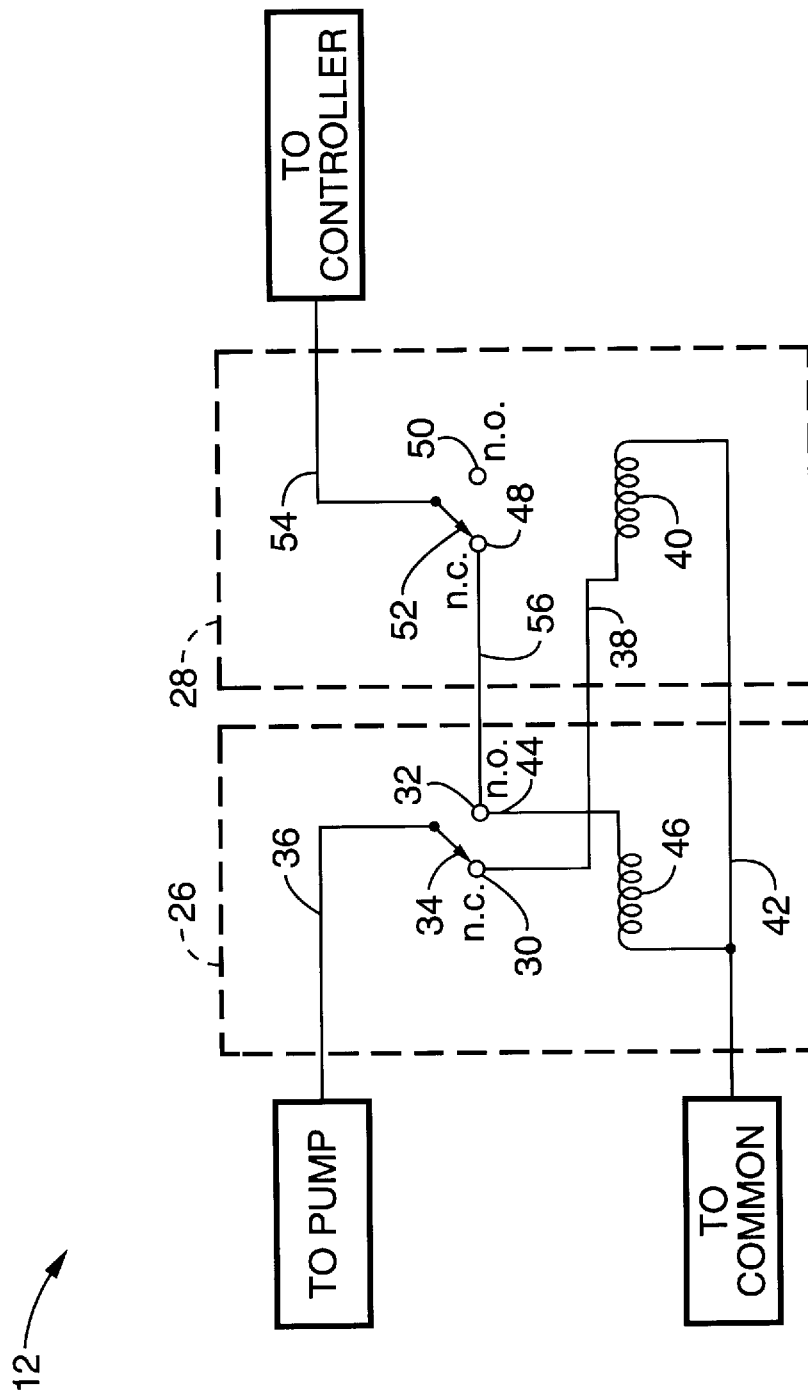
FIG. 2 is a schematic diagram of a circuit isolator apparatus depicted in FIG. 1.

Referring more specifically to the drawings, for illustrative purposes the present invention is embodied in the apparatus generally shown in FIG. 1 and FIG. 2. It will be appreciated that the apparatus may vary as to configuration and as to details of the parts without departing from the basic concepts as disclosed herein. The invention is disclosed in terms of a circuit for a water pump. However, the invention may also be used in conjunction with a master valve or other water regulating systems.

Referring first to FIG. 1, a pump circuit 10 is shown wherein pair of circuit isolator devices 12a, 12b in accordance with the present invention are connected to a corresponding pair of controllers 14a, 14b. Controllers 14a, 14b preferably comprise conventional, commercially available irrigation controllers. For reasons of clarity, only two controllers 14a, 14b and corresponding isolators 12a, 12b are shown with circuit 10. The invention, however, may be used with pump circuits having additional controllers. Circuit 10 includes a pump power wire 16 and a pump/controller common wire 18 which are connected to a conventional pump contactor 20. Contactor 20 is interfaced with a conventional water pump 22 via wire 24. Pump/controller common wire 18 is also connected to the controllers as shown.

Referring more particularly to FIG. 2, as well as to FIG. 1, each circuit isolator 12a, 12b includes a pair of switches, such as first relay 26 and second relay 28 shown. First relay 26 includes a normally closed output or contact 30, a normally open output or contact 32, and a switch arm 34 as means for selection of either contact. A conductor 36 electrically connects pump hot leg power wire 16 to normally closed contact 30 via switch arm 34. Normally closed contact 30 is electrically connected to pump/controller common leg wire 18 via conductor 38, driver or coil 40, and conductor 42. Normally open contact 32 is electrically connected to pump/controller common leg wire 18 via conductor 44, driver or coil 46, and conductor 42. Second relay 28 includes a normally closed output or contact 48, an optional normally open output or contact 50, and a switch arm 52 as means for contact selection. Normally closed contact 48 is electrically connected to an irrigation controller 14 via conductor 54 and switch arm 52, and is electrically connected to normally open contact 32 of first relay 26 via conductor 56. Those skilled in the art will appreciate that solid state switches, optically isolated switches and the like could be used for relays 26, 28 as alternatives to mechanical relays, and that wiring conventions may vary.

In order to start pump 22, the controller must energize relay 26. On the other hand, if pump 22 is already being operated by a controller, the voltage backfeed will energize relay 28 and lock out the other controller(s). Thus, only one of the controllers 14a, 14b can activate pump circuit 10 at a time, and when controller 14a locks into circuit 10, controller 14b is locked out until controller 14a has completed its cycle. However, both controllers 14a, 14b have access to pump circuit 10 without actually being interconnected. Undesirable feedback between controllers 14a, 14b is eliminated by first relay 26. Second relay 28 prevents interconnection of controllers 14a, 14b which would result in damage if controllers 14a, 14b are installed out of phase or with reversed polarity. Pump circuit 10 itself is not affected by isolators 12a, 12b, so both controllers 14a, 14b can operate at the same time if desired, although only one of the controllers 14a, 14b can activate pump 22. Once controller 14a or 14b has completed its cycle, the other controller can activate pump 22.

The circuit isolators 12a, 12b are preferably enclosed in a plastic box (not shown) or the like, with relays 26, 28 positioned side by side therein. Conductors 36, 42, 54 preferably extend from a corner of the box for connection to the controller and the circuit.

The pump circuit 10 described above may include additional controllers 14 and additional isolator devices 12 which are connected with circuit 10 in the manner described above and shown in FIG. 1 and FIG. 2. The invention is particularly well suited for use with commercial building complexes, golf courses, or other situations wherein a large landscaped area is maintained through a single pump or master valve circuit with numerous remote controllers. For example, in irrigation of a golf course or other large landscaped area, a dozen or more 120-volt controllers may be included in a circuit with a single 240-volt pump.

Accordingly, it will be seen that this invention provides a circuit isolator apparatus for pump and master valve circuits which eliminates feedback between controllers sharing the circuit and protects controllers from damage that occurs when one or more controllers are out of phase. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A circuit isolator apparatus, comprising:
   (a) a first switch, said first switch including a first switched output and a second switched output;
   (b) said first switch including first output selector means for selectively connecting said first and second switched outputs to a pump hot leg;
   (c) said first switch including first driver means for controlling said first output selector means, said first driver means having a first input electrically connected to said second switched output, said first driver means having a second input for electrical connection to a pump/irrigation controller common leg;
   (d) a second switch, said second switch including a third switched output;
   (e) said second switch including second output selector means for selectively connecting said third switched output to an irrigation controller hot leg; and
   (f) said second switch including second driver means for operating said second output selector means, said second driver means having a third input electrically connected to said first switched output, said second driver means having a fourth input for electrical connection to said pump/controller common leg.

2. A circuit isolator apparatus, comprising:
   (a) a first relay, said first relay including a first switched output and a second switched output;
   (b) said first relay including first output selector means for selectively connecting said first and second switched outputs to a pump hot leg;
   (c) said first relay including a first relay coil for operating said first output selector means, said first relay coil having a first input electrically connected to said second switched output, said first driver means having a second input for electrical connection to a pump/irrigation controller common leg;
   (d) a second relay, said second relay including a third switched output;
   (e) said second relay including second output selector means for selectively connecting said third switched output to an irrigation controller hot leg; and
   (f) said second relay including a second relay coil having a third input electrically connected to said first switched output, said second relay coil having a fourth input for electrical connection to said pump/controller common leg.

3. A circuit isolator apparatus, comprising:
   (a) a first relay, said first relay including a first normally closed contact, a first normally open contact, a first switch arm, and a first coil, said first switch arm having a first end for electrically contacting said normally open contact and said normally closed contact upon energization and de-energization of said first coil, respectively, said first switch arm having a second end for electrical connection to a pump hot leg, said first normally open contact electrically connected to a first end of said first coil, said first coil having a second end for electrical connection to a pump/controller common leg; and (b) a second relay, said second relay including a second normally closed contact, a second switch arm, and a second coil, said second switch arm having a first end for electrically contacting said normally closed contact upon de-energization of said second coil, said second switch arm having a second end for electrical connection to a controller hot leg, said second normally closed contact electrically connected to said first normally open contact, said second coil having a first end electrically connected to said first normally closed contact, said coil having a second end electrically connected to said pump/controller common leg.

* * * * *